United States Patent [19]

Olander

[11] 4,097,462
[45] * Jun. 27, 1978

[54] PROCESS FOR MAKING POLYPHENYLENE OXIDES

[75] Inventor: Walter Karl Olander, Clifton Park, N.Y.

[73] Assignee: General Electric Company, Pittsfield, Mass.

[*] Notice: The portion of the term of this patent subsequent to May 11, 1993, has been disclaimed.

[21] Appl. No.: 651,682

[22] Filed: Jan. 23, 1976

[51] Int. Cl.$^2$ ............................................. C08G 65/44
[52] U.S. Cl. .................................................. 260/47 ET
[58] Field of Search .................................... 260/47 ET

[56] References Cited

U.S. PATENT DOCUMENTS

| | | | |
|---|---|---|---|
| 3,220,979 | 11/1965 | McNiels | 260/47 |
| 3,306,875 | 2/1967 | Hay | 260/47 |
| 3,956,242 | 5/1976 | Olander | 260/47 ET |
| 3,972,851 | 8/1976 | Olander | 260/47 ET |

*Primary Examiner*—Lester L. Lee
*Attorney, Agent, or Firm*—Morgan, Finnegan, Pine, Foley & Lee

[57] ABSTRACT

A novel process is described for the preparation of polyphenylene oxide resin composition. The process is based on the precipitation of a polyphenylene oxide resin that has been prepared by the oxidative coupling of a phenol in the presence of a manganese (II)ω-hydroxyoxime chelate catalyst by a procedure that entrains the catalyst in the polyphenylene oxide resin.

12 Claims, 1 Drawing Figure

PROCESS FOR MAKING POLYPHENYLENE OXIDES

This invention provides a process for preparing a polyphenylene oxide resin composition. The process is based on the precipitation of a polyphenylene oxide resin that has been prepared by the oxidative coupling of a phenol in the presence of a manganese (II) ω-hydroxyoxime chelate catalyst that entrains the catalyst in the polyphenylene oxide resin.

BACKGROUND OF THE INVENTION

The polyphenylene oxides and processes for their preparation are known in the art and are described in numerous publications, including Hay, U.S. Pat. Nos. 3,306,874 and 3,306,875. Other copper based catalyst procedures are described in the Bennett and Cooper patents, U.S. Pat. Nos. 3,639,656, 3,642,699, 3,733,299 and 3,661,848. In addition, the use of manganese based catalyst procedures is disclosed in McNelis, U.S. Pat. No. 3,220,979 and Nakashio, U.S. Pat. No. 3,573,257.

In the applicant's copending application Ser. No. 534,903 U.S. Pat. No. 3,965,069, filed December 20, 1974, and U.S. Pat. No. 3,956,242 or U.S. Pat. No. 3,973,851, there are disclosed novel procedures for polymerizing polyphenylene oxides with complex manganese based catalysts. All of these disclosures are hereby incorporated by reference. In application Ser. No. 491,370, there are disclosed a number of manganses based catalysts that have been collectively identified as mangenese (II) ω-hydroxyoxime chelate catalysts. These catalysts have been employed to prepare polyphenylene oxide resins by the catalytic oxidation of an organic solution of a phenol in the presence of the complex manganese catalyst wherein the reaction is terminated by quenching with acids that form manganese salts that are soluble in the precipitation effluent, e.g., acetic or hydrochloric acid. Subsequently, the polymer is recovered from the organic reaction solution by the addition of an antisolvent. Generally, the acid quenching has rendered the complex manganese catalyst soluble in the antisolvent and the precipitated polymer has been recovered from the antisolvent, substantially free of catalyst residues. This procedure produces polymer that may be used to prepare molding compositions and is an efficient procedure for making polyphenylene oxides. The overall process is objectionable in that it produces an organic effluent that is contaminated with manganese catalyst residues that must be separated to prevent damage to the environment and to permit the reuse of the reaction solvents.

It has been found that if the manganese (II) ω-hydroxyoxime chelate catalyst is precipitated out of the reaction solution with the polyphenylene oxide resin, a stable molding composition may be prepared. This is unexpected as it has been generally accepted that even trace amounts of metal catalysts rendered polyphenylene oxide compositions unstable to the point where they were commercially unacceptable. The precipitation of the catalyst into the polymer product simplifies the after treatment of the organic reaction solvents and eliminates the need to employ an acid quenching to terminate a polyphenylene ether polymerization reaction that is catalyzed by manganese (II) ω-hydroxyoxime chelate catalyst.

Accordingly, it is a primary object of the present invention to provide a novel process for the manganese (II) ω-hydroxyoxime chelate catalyst polymerization of a phenolic compound that eliminates the need to employ an acid quenching step in the termination of the polymerization.

It is a further object to eliminate the need to separate catalyst residues from the organic reaction byproducts of a manganese (II) ω-hydroxyoxime chelate catalyzed polymerization of a phenolic compound.

BRIEF DESCRIPTION OF THE DRAWINGS

The FIG. 1 is a flow sheet of one of the preferred ways of practising the present invention.

DETAILED DESCRIPTION OF THE INVENTION

Figure 1:
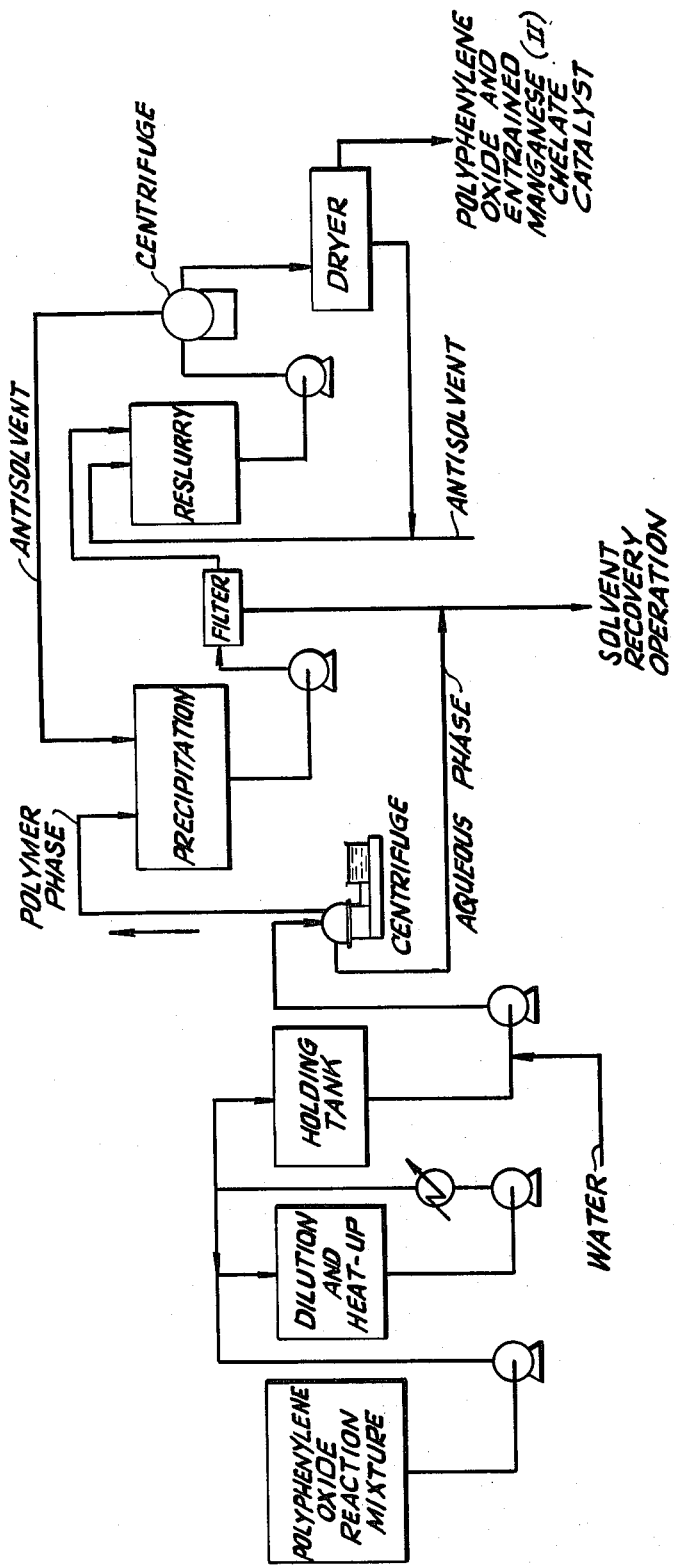

The oxidative coupling of a phenolic compound is carried under polymer forming reaction conditions to form a polyphenylene oxide composition. The process comprises the steps of:

a. oxidatively coupling a phenolic monomer under polymer forming reaction conditions to form a polyphenylene oxide resin in the presence of an organic solvent and a manganese (II) chelate complex of the formula:

$$(L)_x Mn$$

wherein L is a ligand dervied from an ω-hydroxyoxime, Mn is the transition metal manganese (II) and x is at least equal to about 0.5;

b. adding an antisolvent to the reaction mixture of (a) to precipitate out the polymer and catalyst to obtain a polyphenylene ether resin composition that includes said manganese (II) chelate catalyst.

The phenolic monomer that is preferably employed in the practice of the invention is selected from compounds of the formula:

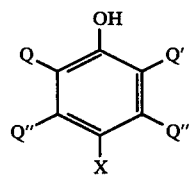

wherein X is a substituent selected from the group consisting of hydrogen, chlorine, bromine and iodine, Q is a monovalent substituent selected from the group consisting of hydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is as defined for Q and is in addition halogen, and Q" are each as defined for Q' and in addition hydrogen, with the proviso that Q, Q' and Q" are all free of a tertiary carbon atom.

The ligand that is used to form the manganese (II) chelate complex of the formula:

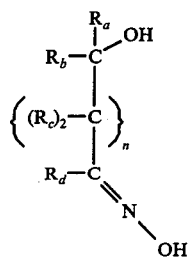

Formula I wherein $R_a$, $R_b$, $R_c$, $R_d$ and n are selected from the group consisting of hydrogen, acyclic and cyclic organic radicals and n is a positive integer equal to 0 or 1.

The manganese (II) chelates can be employed in a mono, bis, tris, tetrakis, etc. ligand form wherein one, two, three, four, etc. bidentate ligands, ie., bidentate ligand being defined as the cyclic ring structure which arises from the union of a manganese (II) atom with a single oxime nitrogen atom and a single hydroxy oxygen atom associated with a single ω -hydroxyoxime ligand forming molecule, are associated with a single MN(II) atom. Often manganese (II) chelates, preferably, are employed in their bis-bidentate form wherein two cyclic ring structures arise from the union of a single MN(II) atom with two separate and distinct ω-hydroxyoxime molecules. Illustrative of Mn(II) chelates in mono-bidentate and bis-bidentate form are the chelates described by Formulas II and III, respectively, set out hereafter.

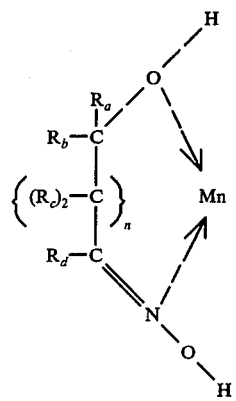

Formula II

,and

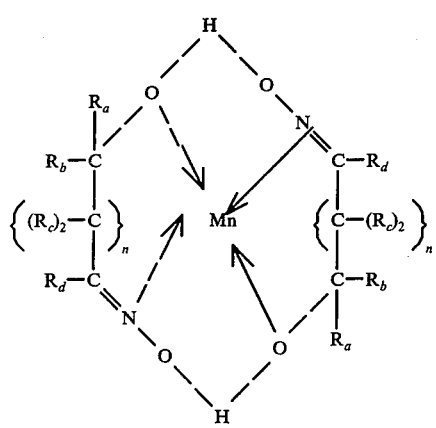

Formula III wherein $R_a$, $R_b$, $R_c$, $R_d$ and n are the same as defined hereinbefore.

The manganese (II) chelates can be prepared by any method known to those skilled in the art which introduces a divalent manganese ion, commonly referred to as Mn(II) or as MN++, to a hydroxyoxime ligand group, i.e., any appropriate hydroxyaldoxime or ketoxime of the Formula I, or any mixture thereof. In general, any amount of manganese (II) and ω -hydroxyoxime can be combined in the preparation of the Mn (II) chelate, however, an amount sufficient to form a Mn ((II) bis-bidentate ligand chelate ring type is preferably employed. The aforesaid aldoxime or ketoxime reactants can be prepared by an method well known to those skilled in the art, such as by the well known reactions of a hydroxylamine with a-or ⊕-hydroxy-substituted aldehyde or ketone, respectively, or by the use of suitable oxime exchange techniques, such as those described in U.S. Pat. No. 3,124,613. In the preparation of the effective MN (II) chelate, a manganese (II) ion associated with ω-hydroxyoxime donor liqand atoms can be derived from any manganese (II) compound which is at least partially dispersible or soluble in an ω-hydroxyoxime solution. Representative manganese (II) compounds include manganese (II) halides such as manganese (II) chloride (also known a manganous chloride), manganese (II) bromide, manganese (II) iodide, etc., as well as other manganese (II) compounds, such as managnese (II) carbonate, manganese (II) oxalate, manganese (II) sulfate, manganese (II) acetate manganese (II) nitrate, manganese (II) phosphate, etc., including hydrated forms of such Mn (II) compounds.

A preferred method of preparing manganese (II) ω-hydroxyoxime chelates comprises the formation of a solution of a manganese (II) compound and a ligand forming hydroxyoxime molecule in a suitable solvent, such as methanol or a combination of methanol and an organic solvent such as chlorobenzene, toluene, and xylene, etc., or mixtures thereof.

The possibility of formation of multiple rings, i.e., five or six-membered chelate rings closedly associatd with hydrogen bonding is believed — especially with the five-membered chelate rings to markedly increase the stability and effectiveness of Mn (II) chelates in promoting the condensation of a phenol to a polyphenylene oxide.

The $R_a$, $R_b$, $R_c$ and $R_d$ substituents attached to the chelate ring carbon atoms of the magnanese (II) ω-hydroxyoxime catalyst — other than hydrogen — can be any acyclic or cyclic organic radical, e.g., alkyl, cycloalkyl, aryl, aralkyl, alkaryl, alkcycloalkyl, cycloalkaryl radicals or combinations thereof, etc., including acyclic and cyclic radicals having electron-releasing constituents, such as amino, i.e. $-NH_2$; monoalkylamino, i.e. $-NHR_1$, dialkylamino, i.e., $-N(R^1)_2$; hydroxy, i.e. $-OH$; alkoxy, i.e. $-OR^1$, and alkanoate, i.e. $-OOCR^1$, $R^1$ in all cases being an alkyl group. Preferably, the $R_a$, $R_b$, $R_c$ and $R_d$ substituents associated with each five- or six-membered chelate ring is selected from acyclic and cyclic hydrocarbon radicals, more preferably at least one of the $R_b$ and $R_d$ substituents is selected from aromatic radicals, and even more preferably both of the $R_b$ and $R_d$ substituents are selected from aromatic radicals. Preferably, the acyclic and cyclic hydrocarbon radicals contain from about 1 to about 30 carbon atoms. Representative of preferred hydrocarbon radicals are the following: methyl, ethyl, propyl, butyl, cyclobutyl, pentyl, cyclohexyl, cycloheptyl, decyl, eicosyl, triacontyl, phenyl, benzyl, methylbenzyl, α-methylbenzyl, methylphenyl, idphenylmethyl, naphthylxyly, etc.

Representative of ω-hydroxyoxime ligand forming molecules that can be employed to prepare the Mn (II) chelates are the following compounds: benzoin oxime, anisoin oxime, paradimethylaminobenzoin oxime, furoin oxime, acetoin oxime, 2-methyl-2-hydroxy-butan-3-one oxime (also known as methylhydroxybutanone oxime), ω-hydroxyacetophenone oxime, 2-methyl-2-hydroxy-4-pentanone oxime, 2-phenyl-2-hydroxy-butan-3-one oxime (also known as phenylhydroxybutanone oxime), adipoin oxime, etc.

The preferred ω-hydroxyoxime ligand forming molecule that can be employed to prepare the Mn (II) complex catalyst is benzoin oxime.

The phenolic monomer and the manganese (II) ω-hydroxyoxime chelate are combined in a solvent. Any liquid may be employed as a solvent provided that it is capable of forming a solution of the phenolic compound and the Mn (II) chelate including ketones, hydrocarbons, chlorohydrocarbons, nitroaromatic hydrocarbons, ethers, sulfoxides, etc., subject to the proviso that the solvents do not interfere with the catalyst activity of the Mn (II) chelate in the preparation of the polyphenylene oxide. Since the solvent for the phenol and the Mn (II) chelate does not need to act as a solvent for the polymer, it may be desirable sometimes to use a solvent system, such as toluene, xylene, chlorobenzene, or nitrobenzene or mixtures thereof with a sufficient amount of methanol as a solvent system in order to cause the polymer to precipitate from the reaction medium while permitting lower molecular weight polymers to remain in solution until they form higher molecular weight polymers. The relative proportions of phenol to solvent can vary widely. Generally, presently acceptable economic reaction parameters comprise a mole proportion of phenol: solvent within the range of from about 20:80 to about 5:95. Presently preferred phenol: solvent mole proportions are within the range of from about 15:85 to about 10:90.

In order to carry out the Mn (II) chelate promoted selfcondensation of phenol to polyphenylene oxide the self-condensation reaction must be carried out in a basic reaction medium, such as that provided by the presence of a strong alkali metal base, e.g. alkali metal hydroxides, alkali metal alkoxides, etc., or mixtures thereof. Commercially available alkali metal bases which are readily attainable are presently preferred, such as sodium hydroxide, potassium hydroxide, lithium hydroxide, sodium methoxide, etc. Currently, it is preferred that anhydrous sodium hydroxide be employed to provide the strong basis reaction environment essential to the polymerization reaction, however, aqueous solutions, e.g. 50 percent, sodium hydroxide can be employed for convenience. The quantity of alkali metal base which is essential to the promotion of the self-condensation reaction can readily be determined without undue experimentation by those skilled in the art. In general, however, suitable phenol: alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol: alkali metal hydroxide mole ratio within the range of from about 14:1 to about 18:1.

In general, the mole proportions of phenol: Mn (II) chelate can vary widely to provide any desired — including minimum, maximum or optimum — degree of promotion of the reaction rate of phenols to polyphenylene oxide. Although not wishing to limit this invention by any theory, it is believed that the Mn (II) chelate reaction promoter functions as a true catalyst which remains essentially unconsumed or unchanged, e.g. a Mn (II) compound which is neither hydrolyzed nor dissociated due to thermal or other effects into a non-catalytic form during the self-condensation process. Apparently, the reason that the Mn (II) chelate behaves as a true catalyst is due to the unexpected stability of the Mn (II) five- or six-membered ω-hydroxyoxime chelate rings during preparation of the polyphenylene oxides.

Advantageously and unexpectedly, it has been found that the Mn (II) chelate catalyst can be employed in very small amounts relative to the amount of phenol reactant while maintaining and often improving the rate of formation of a polyphenylene oxide compared to the rates of polyphenylene oxide formation associated with prior art processes. In general, however, subject to variations in accordance with the type of ω-hydroxyoxime ligand associated with the Mn (II) chelate, reaction rates comparable to those of the prior art can be obtained wherein the phenol to Mn (II) chelate mole ratio is within the range of from as low as about 100:1 to as high as about 3000:1, or even as high as about 6000:1 wherein the reactions are carried out under (a) superatmospheric, or or (b) in the presence of certain primary amines, or even as high as about 12,000:1 wherein the reactions are carried out under both (a) superatmospheric pressure and (b) in the presence of certain primary amines.

In general, it is preferred that minimum quantities of Mn (II) chelate be employed for economic reasons and to provide a polyphenylene oxide containing a minimum amount of the manganese catalyst residue. Accordingly, it is preferred that the initial reaction media mole ratio of phenol: manganese II) to be at least about 500:1, more preferably at least 1500:1, and even more preferably at least 3000:1, wherein this process is carried out at (a) atmospheric or subatmospheric pressures and (b) in the absence of certain primary amines.

As used herein and in the appended claims wherein phenol: manganese (II) numerical ratios are described, it is to be understood that the numerical proportions describe the number of moles of phenol relative to the number of atoms of managanese (II) associated with the Mn (II) chelate independent of the chelate form, i.e., mono-bidentate, bis-bidentate, etc.

In general, the reaction temperature employed in the preparation of polyphenylene oxide in the presence of the Mn (II) chelate catalyst can be varied widely. Suitable polymerization temperatures generally fall within the range of from about 0° to about 50° C., preferably within the range of from about 10° to about 40° C., and more preferably within the range of from about 20° to 30° C. since generally optimum self-condensation reaction rates have been found to exist within the 20° to 30° C temperature range. Unexpectedly, contrary to many of the Mn (II) chelate catalysts employed in this process, Mn (II) chelates having strong electron-releasing constitutents, e.g. dialkylamino radicals attached to $R_a$, $R_b$, $R_c$ or $R_d$ aromatic substituent of Formulas II or III promote optimum reaction rates at temperatures at or above 35° C. Because the self-condensation reactions are exothermic in nature and the Mn (II) chelates are susceptible to thermal deactivation, it is generally desirable to program the addition of the phenolic monomeric reactant, and in some instances the Mn (II) chelate catalyst, during their initial contact within the reaction media. This programmed addition permits a suitable reaction temperature profile to be obtained whereby the reaction is maintained within a temperature range suited to optimum catalyst efficiency and optimum yields of polyphenylene oxide resin. In general, more latitude with regard to the upper limits of the reaction temperature range can be obtained wherein the process is carried out at superatmospheric pressures, e.g., 1 to 40 psig, 1 to 1000 psig, or even higher pressures. In the event that the self-condensation reaction is discontinued or interrupted due to deactivation of the Mn (II) chelate at elevated temperatures, the reaction can be resumed in a normal fashion by reducing the temperatures of reaction medium and adding thereto additional manganese (II) chelate catalyst in the amounts required to initiate and maintain the desired catalyst efficiency.

Although certain primary, secondary or tertiary amines, such as those disclosed in U.S. Pat. Nos. 3,306,874, 3,306,875, 3,384,619, 3,639,656 and 3,646,699, etc., have been taught by the prior art as being essential to the catalytic oxidative coupling of phenols carried out in the presence of certain copper-amine complexes in the preparation of polyphenylene oxide, it is unessential that any amine be employed in combination with a Mn (II) chelate catalyst in the preparation of polyphenylene oxide in accordance with the process of this invention.

Quite unexpectedly, it has been found that the use of a primary amine in combination with the Mn (II) chelate catalyst of the process of this invention enhances substantially the rate of self-condensation of phenols in comparison to reaction rates asssociated with the use of the Mn (II) chelate catalyst in the absence of a primary amine. Because of the improvement in the reaction rates, wherein Mn (II) chelate-amine combinations are used in this invention, the amount of Mn (II) chelate catalyst employed can be substantially reduced — thereby increasing the phenol to Mn (II) chelate ratio — while still maintaining a polyphenylene oxide reaction rate comparable to that found in the absence of a primary amine.

That the above effect of a primary amine is quite unexpected is substantiated by the finding that when a secondary amine -such as those commonly employed in the copper-amine complexes of the aforementioned prior art — is substituted for a rate enhancing primary amine as described in the invention, that the Mn (II) chelate catalyst activity is unaffected or even moderately decreased.

The primary amine classes which can be employed include any primary mono- or polyamine of the following formula:

$$R^2(NH_2)_y \qquad (IV)$$

wherein $R^2$ is selected from mono- or polyvalent aliphatic and aromatic radicals, or combinations thereof, $y$ is a positive integer equal to at least 1, subject to the proviso that (a) at least three carbon atoms separate any amino (—$NH_2$) group from any other amino (—$NH_2$) group and (b) at least two carbon atoms separate any amino group (—$NH_2$) from any other nucleophile. As used herein and in the appended claims, the term "any other nucleophile" is intended to describe and include any electronreleasing group selected from the group consisting of monoalkylamino, —$NHR^1$; dialkylamino, —$N(R^1)_2$; hydroxy, —OH; alkoxy, —$OR^1$; or alkanoate, —$OOCR^1$ group; $R^1$ in all instances being an alkyl group. More specific descriptions, including examples of individual mono- and polyamines, of Formula IV follow:

methylamine,
ethylamine,
2-hydroxyethylamine,
2-methylaminoethylamine,
n-propylamine,
isopropylamine,
cyclobutylamine,
tertiary-butylamine,
cyclobutylamine,
1,4-butanediamine,
4hydroxybutylamine,
4-ethoxybutylamine,
n-pentylamine,
1,5-pentanediamine,
cyclopentylamine,
n-hexylamine,
4-isopropylcyclohexylamine,
bis(3-aminopropyl)sulfide,
1,4-cyclohexanediamine,
N-methyl-bis(3-aminopropyl)amine,
3-methoxyhexamethylenediamine,
benzylamine,
1,6-hexanediamine,
1,3-xylenediamine - also known as
1,3-bis(aminomethyl)benzene,
1,3-bis(aminomethyl)cyclohexane,
1,2-bis(3-aminopropoxy)ethane,
3-methylheptamethylenediamine,
1,8-octanediamine,
4-isopropyl-1,3-phenylenediamine,
bis(4,4'-aminocyclohexyl)methane,
1,5-diaminonaphthalene,
bis(3,3'-aminophenyl)methane,
bis(4,4'-aminophenyl)methane,
5-hydroxynonamethylenediamine,
4,4'-diaminodiphenylsulfide,
4,4'-diaminodiphenylsulfone,
4,4'-diaminodiphenylether,
3,3'-dimethylbenzidine,
3,3'-dimethoxybenzidine,
4,4'-diaminodiphenylmethane,
bis(p-β-amino-t-butylphenyl)ether,
n-eicosylamine,
1,20-eicosanediamine,
1,30-tricontanediamine, etc.

Preferably, the primary amines are mono- or polyamino substituted aliphatic or aromatic molecules having other than hydrogen only amine (—$NH_2$) nucleophilic substituents attached to carbon atoms. Particularly preferred amines are polyamino (—$NH_2$) substituted mono- and polycyclic aromatic compounds wherein the amino groups are bonded directly to either an aromatic ring carbon atom or to an aliphatic group that is bonded to an aromatic ring carbon atom. Presently preferred, Type A, and more preferred, Type B, polyamino (—$NH_2$) substituted mono- and polycyclic aromatic compounds can be represented by the following formulas:

| Formula | | Type A | Type B |
|---|---|---|---|
| V(a) | (Z)$_p$ on benzene ring | p is ≧ 2 | p is 2 |
| V(b) | (Z)$_p$ on S-containing ring | p is ≧ 2 | p is 2 |
| VI(a) | (Z)$_p$—◯—◯—(Z)$_p$ | p is ≧ 1 | p is 1 |
| VI(b) | (Z)$_p$—◯(S)—(S)◯—(Z)$_p$ | p is ≧ 1 | p is 1 |
| VII(a) | (Z)$_p$, (Z)$_p$ on naphthalene | p is ≧ 1 | p is 1 |
| VII(b) | (Z)$_p$, (Z)$_p$ on S-containing fused ring | p is ≧ 1 | p is 1 |
| VIII(a) | (Z)$_p$—◯—Y—◯—(Z)$_p$ | Y in IX(a) + IX(b) is C$_{1-6}$ | Y in IX(a) + IX(b) |
| VIII(b) | (Z)$_p$—◯(S)—Y—(S)◯—(Z)$_p$ | alkylene —O—, —S— —SO$_2$—, NR$^3$, wherein R$^3$ is C$_{1-6}$ alkyl radical | same as in Formula IX(a) and IX(b) Type A | wherein Formulas V through VIII, each Z is independently selected from —NH$_2$ and —R$^4$—NH$_2$ radicals, R$^4$ being a C$_{1-6}$ alkylene radical. Specific examples of polyamines of Formulas V to VIII compounds include 1,3-bis-(β-aminoethyl)benzene; 1,4-bis(γ-amino-n-hexyl)benzene; 3,3′,5,5′-tetraaminobiphenyl; 1,8-bis(β-amino-n-butyl) naphthalene, 1,3-phenylenediamine; 1,4-phenylenediamine; 4,4′-diaminodiphenylpropane; 4,4′-diaminodiphenylmethane (also known as methylenedianiline); benzidine; 4,4′-diaminodiphenylsulfide; 3,3′,5,5′-tetraaminodiphenylsulfone; 4,4′-diaminodiphenylether; 1,5-diaminonaphthalene; etc.

In general, when aliphatic mono- or polyamines are employed, I prefer that the amines be straight chain hydrocarbon groups having from about 1 to about 30 carbon atoms, and more preferably having from about 4 to about 15 carbon atoms. Wherein aromatic amines are used, I prefer that the aromatic amines have from about 7 to about 30 carbon atoms, and more preferably have from about 7 to about 15 carbon atoms.

In general, the amount of amines employed in the practice of this invention can vary widely. Presently preferred mole ratios of phenols: amines are within the range of from about 100:0.05 to about 100:1.5.

In general, it has been found that the use of aliphatic diamines can reduce polyphenylene oxide reaction time by as much as one-half of the reaction time generally found when aliphatic monoamines are employed as Mn (II) chelate rate enhancers, and that the use of aromatic diamines can further reduce the polyphenylene oxide reaction time by as much as one-half of the reaction time generally found when aliphatic diamines are used as the Mn (II) chelate rate enhancers. As will be apparent to those skilled in the art, the variations in both the amounts and types of Mn (II) chelates and primary amines employed in order to acquire any desired degree of reaction rate promotion is essentially unlimited. The polymerization is preferably carried out by first preparing a solution of 2,6-xylenol and toluene; a first part being charged to a reactor and another second part being charged to a pump reservoir for the purpose of being added at a generally constant rate to the reactor after initiation of the self-condensation reaction of the phenol to polyphenylene oxide. Stoichiometric amounts, sufficient to form a bis-bidentate chelate, of a Mn (II) compound, e.g. Mn (II) dichloride and a chelate ligand forming molecule, e.g. benzoin oxime, are combined and dissolved in a minimum amount of a Mn (II) chelate-solvent, e.g. methanol. After the Mn (II) chelate-solvent solution is complete, an amount of a phenol-solvent equal to the Mn (II) chelate-solvent is added thereto. It is preferred to include in the reaction mixture from 1–2 mole percent based on the monomer, of a dialkyl amine such as di-n-butylamine. A stream of oxygen is introduced into the reactor at ambient temperature at a rate fast enough to provide sufficient oxygen to be in excess over that being absorbed while vigorously stirring the solution. The manganese chelate catalyst solution is then added to the 2,6-xylenol toluene solution. A 50% aqueous sodium hydroxide solution taken up in methanol is added to the reactor in an amount sufficient to provide a 16:1 phenol to OH- mole ratio during the preparation of the polyphenylene oxide.

After initiation of the polymerization reaction, the reaction is regulated by the rate of addition of the second portion of phenol reactant from the pump reservoir to the reactor in order to provide a controllable exotherm so that the temperature does not exceed substantially 45° C., preferably 35° C. When a polyphenylene oxide intrinsic viscosity of about 0.45 as measured in chloroform at 25° C. is obtained, the reaction is terminated by the addition of an antisolvent. The antisolvents are well known and include lower alkanols having from 1–8 carbon atoms. The preferred antisolvent is methanol.

The antisolvent may be added directly to the polymerization reaction mixture to precipitate the polyphenylene ether resin along with the manganese chelate catalyst. The alkali activated manganese chelate catalyst is soluble in the typical organic reaction solvent such as toluene while it is insoluble in the typical antisolvent such as methanol. These differences in solubility make possible the entrainment of the manganese chelate catalyst in the precipitated polyphenylene ether resin. In a more preferred manner of carrying out the invention, the reaction mixture is subjected to a phase separation step to remove reaction byproducts, alkali residues, inorganic salts and the water of reaction.

The phase separation is carried out by adding to the reaction mixture from 3 to 20 volume percent of water, preferably 6–8 volume percent of water, based on the total volume of the reaction mixture. Also to aid in resolving the reaction mixture into two phases, an amount of a phase transport agent is employed that promotes the resolution of the added water and the reaction mixture combination into two distinct phases. The quaternary ammonium salts are suitable phase transport agents. They may be selected from the compounds of the formula:

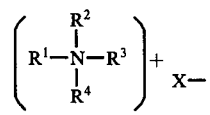

wherein $R^1$, $R^2$, $R^3$ and $R^4$ are alkyl, aralkyl, and alkenyl groups of from 1-24 carbon atoms and X is an anion. The preferred anions are halides such as bromine, chlorine, sulfate or phosphate. Mixtures of the ammonium salts may also be employed and the total number of carbon atoms in the $R^1$, $R^2$, $R^3$ and $R^4$ substituents should be at least 10. The quaternary ammonium salts may be employed at a range of from 50-500 ppm based on the organic solvent, and more preferably 100 to 200 ppm, based on the organic solvent.

The quaternary ammonium salts are well known and many are commercially available. The alkyl substituents may be methyl, ethyl, propyl, butyl, hexyl, oxtyl, decyl, cetyl, hexadecyl and isomers thereof. Mixtures of these compounds may also be employed. The aralkyl substituent may include alkyl-monocarbocyclic radicals having from 7 to 20 carbon atoms such as benzyl, phenethyl and the like. The alkenyl substituents include straight and branched chain unsaturated hydrocarbon atoms of from 1-24 carbon atoms which contain one or more double bonds.

The quaternary ammonium salts are well known and many are commercially available. For example, reference may be made to Kirk-Othmer Encyl. of Chemical Technology, second edition, Volume 16, pp. 859-865; Arquads, Armour Industrial Co. (1956) and Schwartz, A. M. et al, Surface Active Agents, Vol. 1, pp. 156-171 and Interscience Publishers (1949) and Vol. II, pp. 112-118 (1958), all of which are incorporated by reference. A particularly useful compound is methyl-tri-n-octylammonium chloride.

The combination of water, phase transport agent and reaction mixture are agitated to obtain intimate contact of the reaction mixture with the added water and the phase transport agent. Thereafter, this mixture is resolved into a heavy aqueous phase and a light polymer phase, preferably with the aid of a liquid-liquid centrifuge. The heavy layer contains water, most of the methanol that may have been added, alkali, inorganic salts and reaction byproducts that are soluble in the alkaline methanol-water mixture. The light layer contains the polyphenylene oxide resin, the organic reaction solvent, the phase transport agent and the manganese chelate catalyst. The phases are separated, e.g., by decantation or centrifugation, and the light phase is contacted with an antisolvent to precipitate out a polyphenylene oxide resin in which the manganese catalyst is entrained. The precipitated polyphenylene oxide resin is treated in accordance with conventional techniques to dry the resin and prepare it for use as a molding composition, or for fiber or film applications.

FIG. 1 of the drawings is a flow sheet that illustrates a procedure for carrying out the process of this invention with a preliminary phase separation step. The phase transport agent may be present during the polymerization reaction, or it may be added to the reaction mixture after the termination of polymerization. The polyphenylene ether reaction mixture may optionally be diluted with an organic solvent such as toluene and heated to 110°-140° F. Thereafter, it is pumped to a holding tank that is used to feed the centrifuge. Water is preferably added to the line through which the reaction mixture is pumped to the centrifuge. After phase separation the heavy aqueous phase is passed to a solvent recovery and recycle operation. The light polymer phase is passed to the precipitator where an antisolvent is added to cause the polyphenylene oxide resin and the manganese chelate catalyst to precipitate. Subsequently, the polymer composition is reslurried with antisolvent to insure complete precipitation, and it is subjected to solvent separation in a centrifuge and is dried to yield the polyphenylene oxide resin having the entrained manganese chelate catalyst.

DESCRIPTION OF THE PREFERRED EMBODIMENTS

GENERAL PROCEDURE 2,6-xylenol monomer is dissolved to yield a solution which is about 40 to 60 percent 2,6-xylenol by weight. The catalyst is dissolved in two liters of methanol and sodium hydroxide is dissolved in 4 liters of methanol. The polymerization reaction is carried out in a 50 gallon reactor. The 2,6-xylenol is dissolved in toluene and 15% of this solution is combined with the aqueous sodium hydroxide, methanol, remaining toluene and the di-n-butylamine. The temperature of the reaction mixture is adjusted to 80° F and oxygen flow is set for 200 SCFH. The catalyst is added and the remaining 2,6-xylenol-toluene solution is added over 40 minutes to control the rate of polymerization. Temperatures are maintained at about 80° to 85° F. Polymerization is initiated by sparging in oxygen and terminated by purging the reactor with nitrogen, to replace the oxygen and by raising the temperature to 130° or 140° F.

EXAMPLE 1

The following materials were charged to a reactor according to the general procedure set forth hereinabove:

| | |
|---|---|
| 2,6-xylenol | 58.7 lbs. |
| toluene | 199.6 lbs. (27.6 gal.) |
| methanol | 35.2 lbs. (5.3 gal.) |
| sodium hydroxide | 1066 gm. (50% w/w aq. sol.) |
| di-n-butylamine | 2.7 wt. % (based on toluene |
| Catalyst | |
| manganese chloride | 18.9 gm. |
| benzoin oxime | 68.9 gm. |
| (catalyst: 2,6-xylenol = 1500:1) | |

The polymerization was carried out for 100 minutes according to the general procedure set forth hereinabove. The reaction was terminated by replacing the oxygen with nitrogen and by heating the reaction mixture to 140° F. The poly(2,6-dimethyl-1,4-phenylene oxide) was precipitated with methanol and the polymer was dried. The IV was 0.58 dl/g as measured in chloroform at 25° C. The Mn content was 280 ppm. (92.5% of theoretical amt. of 305 ppm).

EXAMPLE 2

The procedure of Example 1 was repeated except that the reaction was run for 134 minutes. After the reaction was terminated and toluene was added to the polymer concentration to 16 weight percent, the polymer was isolated by methanol precipitation as in Example 1. The IV of the poly(2,6-dimethyl-1,4-phenylene oxide) was 0.41 dl/g as measured in chloroform at 25° C. The combined toluene and methanol filrate after precipitation contained less than 0.1 ppm of manganese which corresponds to ½ of 1% of the catalyst.

EXAMPLE 3

The procedure of Example 1 was repeated except that 1316 gm of 40.5 w/w % sodium hydroxide and 2.6 w % based on toluene of di-n-butylamine was employed. After 110 minutes of polymerization, the reaction was terminated and the polymer was directly precipitated with methanol. The poly(2,6-dimethyl-1,4-phenylene oxide) had an IV of 0.55 dl/gm as measured in chloroform at 25° C. The combined methanol and toluene effluent contained less than 0.1 ppm.

EXAMPLE 4

This procedure represents a particularly preferred manner of carrying out the present invention. The following material was charged to a good gallon reactor:

| | |
|---|---|
| 2,6-xylenol | 5200 lbs. |
| toluene | 2434 gallons |
| methanol | 480 gallons |
| sodium hydroxide | 208 lbs. (50% w/w aq. sol.) |
| di-n-butylamine | 2.6 wt. % (based on toluene) |
| Methyl-tri-m-Octylammonium Chloride | 2.3 lbs. |
| Catalyst | |
| manganese chloride | 4.42 lbs. |
| benzoin oxime | 16.13 lbs. |
| (Mol ratio of 1250:1 of 2,6-xylenol to manganese). | |

The general procedure of Example 1 was followed except that 2,6-xylenol solution and the sodium hydroxide were not combined in the methanol. The polymerization was terminated after 105 minutes and the poly(2,6-dimethyl-1,4-phenylene oxide) had an IV of 0.57 dl/gm measured in chloroform at 25° C. The polymer solution was reduced to 16% solids by the addition of 900 gallons of additional toluene and 7.5 volume percent of water was added. The temperature was also raised to 130° F. Using a Westphalia liquid centrifuge, a heavy phase with a specific gravity of 0.94 to 0.95 is separated. This phase is composed of approximately equal parts methanol and water which contains dissolved sodium hydroxide. The manganese concentration in this dark colored heavy phase is less than 1 ppm. A polymer phase having a specific gravity of 0.89 to 0.90 is isolated and precipitated with methanol.

The manganese concentration in the effluent from the precipitation step was less than 0.1 ppm. Typical manganese concentrations in the isolated poly(2,6-dimethyl-1,4-phenylene oxide) resin range between 355 to 375 ppm compared to a theoretical value of 375 ppm.

EXAMPLE 5

Following the procedure of Example 1, the following materials were charged to a reactor:

| | |
|---|---|
| 2.6-xylenol | 58.7 lbs. |
| toluene | 199.6 lbs. |
| methanol | 35.2 lbs.(5.3 Gals.) |
| sodium hydroxide | 1066 gm. (50% w/w aq. sol.) |
| di-n-butylamine | 400 gm. |
| Catalyst | |
| manganese chloride | 18.9 gm. |
| benzoin oxime | 68.9 gm. |

After 110 minutes the polymerization is terminated and the IV was determined to be 0.5 dl/gm as measured in chloroform at 25° C. The temperature was raised to 130° F and the polymer concentration was reduced to 16% solids by the addition of 10 gallons of toluene. Thereafter 11 gm. of tri-methyl-n-octyl ammonium chloride* are added with 3 gallons of water. A portion of the resulting mixture is phase separated by centrifugation in a liquid-liquid centrifuge and 8 gallons of the organic polymer phase are contacted with 56.72 gm of 50% acetic acid. This mixture is contacted with methanol to precipitate the poly(2,6-dimethyl-1,4-phenylene oxide). The manganese concentration is 20 ppm.

*Aliquat 336

An identical 8 gallon portion of centrifuged polymer phase was precipitated without acid treatment. The manganese concentration of the final polymer is 208 ppm.

Test pieces were prepared from a sample of the acid treated polymer and the directly precipitated materials. The test pieces were prepared from 85 parts of the poly(2,6-dimethyl-1,4-phenylene oxide) and 15 parts of triphenylphosphate. They were extruded at 550° F and molded at 500° F.

The Izod impact strengths were tested (⅛ inch notch). The results were as follows:

| Directly precipitated polymer | Acid treated polymer |
|---|---|
| 0.93 ft.lbs./in. | 1.0 ft.lbs./in. |

Tensile strength tests were carried out at 125° C. as stated in Table 1, to evaluate the relative thermal stability of the test pieces.

TABLE I

| Directly precipitated polymer | | Acid treated polymer | |
|---|---|---|---|
| % elongation | time | % elongation | time |
| 68.3% | 0 days | 84% | 0 days |
| 19% | 3 days | 17.6% | 3 days |
| 12.4% | 6 days | 14.7% | 6 days |
| 11.7% | 8 days | 13.1% | 8 days |
| 11.9% | 13 days | 10% | 13 days |
| 9.3% | 15 days | 9.6% | 15 days |
| 10.9% | 17 days | 10.7% | 17 days |

This test data demonstrates the entrainment of the manganese catalyst in poly(2,6-dimethyl-1,4-phenylene oxide) does not materially affect the thermal aging of molded articles.

Compositions were prepared from the directly precipitated polyphenylene oxide and from the acid treated polyphenylene oxide that had the following composition:

| | parts by weight |
|---|---|
| poly(2,6-dimethyl-1,4-phenylene) oxide | 55 |
| rubber modified high impact polystyrene* | 45 |
| polyethylene | 1.5 |
| triphenyl phophate | 4.0 |
| tridecyl phosphate | 1.0 |
| zinc sulfide | 0.15 |
| zinc oxide | 0.15 |
| titanium dioxide | 3.0 |

*Foster Grant 834, a rubber modified polystyrene containing about 8% by weight of butadiene rubber Test bars of these compositions were prepared and the initial properties were as follows:

| Directly precipitated polymer | | Acid treated polymer |
|---|---|---|
| Izod impact (1/8" notch) | | |
| 3.5 ft.lbs./in. | | 3.2 ft.lbs./in. |
| Elongation, % | 76% | 77% |
| Tensile yield | 9400 | 9500 |
| Tensile break | 8600 | 8800 |

Test samples of the composition were aged at 115° C to determine the thermal oxidation stability:

| Directly precipitated polymer | Acid treated polymer |
|---|---|
| 29.9 (days to embrittlement) | 32.9 (days to |

| Directly precipitated polymer | Acid treated polymer |
|---|---|
| | embrittlement) |

COMPARATIVE EXAMPLE A

This comparative example is illustrated of the efficient manner in which the use of acid neutralization efficiently prevents the entrainment of the manganese (II) chelate catalyst in polyphenylene oxide polymers.

Using the general procedure employed in Example 1, the following materials were charged to a 50 gallon reactor:

| | |
|---|---|
| 2,6-xylenol | 46.7 lbs. |
| toluene | 29.1 gallons |
| methanol | 35.0 lbs. |
| di-n-butylamine | 0.49 lbs. |
| sodium hydroxide | 866.2 gm (50% w/w aq. sol.) |
| Catalyst | |
| manganese chloride | 14.6 gm |
| benzoin oxime | 52.6 gm |
| (ratio of 2,6-xylenol: | |
| Mn = 1500:1) | |

Half of the monomer is added initially and the other half is added over a 35 minute period. After 120 minutes, the reaction is terminated and the IV of the poly(2,6-dimethyl-1,4-phenylene oxide) is 0.48 dl/gm as measured in chloroform at 25° C. Thereafter, 3.3 Kg of 50% w/w aqueous acetic acid is added and the entire solution is methanol precipitated. The manganese concentration is equal to or less than 4 ppm which indicates that essentially 98% of the manganese is solubilized in the aqueous methanol and does not precipitate with the poly(2,6-dimethyl-1,4-phenylene oxide).

Although the above examples have shown various modifications of the present invention, other variations are possible in light of the above teachings. It is, therefore, to be understood that change may be made in the particular embodiments of the invention described which are within the full intended scope of the invention as defined by the appended claims.

I claim:

1. A process for the preparation of a polyphenylene oxide resin composition which comprises the steps of:
   a. oxidatively coupling a phenolic monomer having the formula

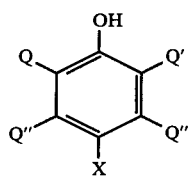

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is as defined for Q, and in addition, halogen, and Q'' are each as defined for Q' and in addition hydrogen with the proviso that Q, Q' and Q'' are all free of a tertiary carbon atom in the presence of oxygen in a basic reaction medium to form a polyphenylene oxide resin in the presence of an organic solvent and a manganese (II) chelate complex of the formula:

$(L)_x Mn$ wherein L is a ligand derived from a $\omega$-hydroxyoxime of the formula

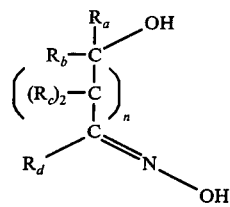

wherein $R_a$, $R_b$, $R_c$, $R_d$ and $n$ are selected from the group consisting of hydrogen, acyclic and cyclic organic radicals and $n$ is a positive integer equal to 0 or 1, Mn is the transition metal manganese (II) and x is at leat equal to about 0.5;
   b. adding an antisolvent to the reaction mixture of (a) to precipitate out the polymer and catalyst to obtain a polyphenylene oxide resin composition.

2. The process of claim 1 wherein the oxidative coupling is carried out in the presence of a primary or secondary amine.

3. The process of claim 2 wherein the phenolic monomer is 2,6-xylenol.

4. The process of claim 3 wherein the manganese (II) chelate complex is manganese benzoin oxime.

5. The process of claim 4 including the step of carrying out a phase resolution of the reaction mixture prior to the addition of antisolvent by combining water and a compound of the formula:

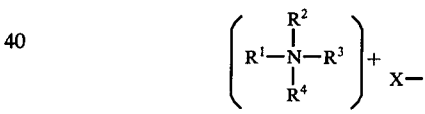

wherein $R^1$, $R^2$, $R^3$ and $R^4$ are alkyl, aralkyl and alkenyl groups of from 1-24 carbon atoms and $X^-$ is an anion with the reaction mixture, agitating the combination and separating the heavy aqueous phase from the light polymer phase prior to adding the antisolvent to the light polymer phase to precipitate the polyphenylene oxide composition.

6. A process for the preparation of a polyphenylene oxide resin composition which comprises the steps of:
   a. oxidatively coupling a phenolic monomer of the formula:

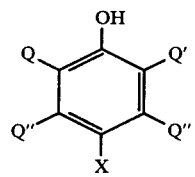

wherein X is a substituent selected from the group consisting of hydrogen, chlorine, bromine and iodine, Q is a monovalent substituent selected from the group consisting of hydrocarbon radicals halohydrocarbon radicals having at least two carbon atoms between the halogen atom and the phenol nucleus, hydrocarbonoxy radicals and halohydrocarbonxy radicals having at least two carbon atoms between the halogen atom and the phenol nucleus; and Q' is as defined for Q, and in addition may be halogen and Q" are each as defined for Q' and in addition, hydrogen, with the proviso that Q, Q' and Q" are all free of tertiary carbon atom in the presence of oxygen in a basic reaction medium to form a polyphenylene oxide resin in the presence of an organic solvent and a manganese (II) chelate complex of the formula:

(L)x Mn wherein L is a ligand derived from a ω-hydroxyoxime of the formula:

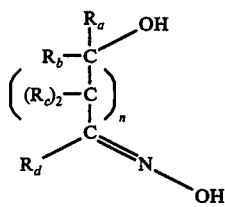

wherein $R_a$, $R_b$, $R_c$, $R_d$ and $n$ are selected from the group consisting of hydrogen, acyclic and cyclic organic radicals and $n$ is a positive integer equal to 0 or 1, Mn is the transition metal manganese (II) and x is equal to about 0.5;

b. adding to the reaction mixture (a), and an amount of a phase transport agent that promotes the resolution of the added water and the reaction mixture combination into two distinct phases to obtain intimate contact of the reaction mixture, the water and the phase transport agent, said phase transport agent being selected from compounds of the formula:

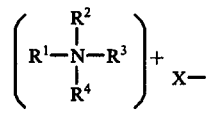

wherein $R^1$, $R^2$, $R^3$ and $R^4$ are alkyl, aralkyl and alkenyl groups of from 1–24 carbon atoms and $X^-$ is an anion;

c. resolving the mixture obtained in (b) into a heavy aqueous phase and a light polymer phase; and d. adding an antisolvent to the light polymer phase of (c) to precipitate out the polymer and catalyst to obtain a polyphenylene oxide resin composition.

7. The process of claim 6 wherein the oxidative coupling is carried out in the presence of a primary or secondary amine.

8. The process of claim 7 wherein the organic solvent is toluene and the phenolic monomer is 2,6-xylenol.

9. The process of claim 8 wherein the manganese (II) chelate catalyst is manganese (II) benzoin oxime.

10. The process of claim 9 wherein the antisolvent is methanol.

11. The product produced by the process of claim 1.

12. The process of claim 10 wherein methyl-tri-n-octylammonium chloride is employed.

* * * * *

UNITED STATES PATENT AND TRADEMARK OFFICE
CERTIFICATE OF CORRECTION

PATENT NO. : 4,097,462
DATED : June 27, 1978
INVENTOR(S) : Walter Karl Olander

It is certified that error appears in the above-identified patent and that said Letters Patent are hereby corrected as shown below:

In Column 1, line 29, "manganses" should be --manganese--.

In Column 2, line 11, "The" should be deleted.

In Column 3, line 25, "MN (II)" should be --Mn(II)--.

In Column 3, line 28, "MN(II)" should be --Mn(II)--.

In Column 4, line 14, "an" should be --any--.

In Column 4, line 16, " $\oplus$ " should be --$\beta$--.

In Column 4, line 20, "MN(II)" should be --Mn(II)--.

In Column 4, line 41, "fiveor" should be -- five or--.

UNITED STATES PATENT AND TRADEMARK OFFICE
CERTIFICATE OF CORRECTION

PATENT NO. : 4,097,462
DATED : June 27, 1978
INVENTOR(S) : Walter Karl Olander

It is certified that error appears in the above-identified patent and that said Letters Patent are hereby corrected as shown below:

In Column 4, line 55, "$NHR_1$" should be --$NHR^1$--.

In Column 4, line 61, "and" should be --or--.

In Column 5, line 2, "naphthyxyly" should be --naphthylxylyl--.

In Column 5, line 53, "basis" should be --basic--.

In Column 9, in the Table under Type B, after line 21, insert "is the".

In Column 12, line 56, after "to" insert --reduce--.

In Column 13, line 11, change "good gallon" to --6000 gallon--.

UNITED STATES PATENT AND TRADEMARK OFFICE
CERTIFICATE OF CORRECTION

PATENT NO. : 4,097,462
DATED : June 27, 1978
INVENTOR(S) : Walter Karl Olander

It is certified that error appears in the above-identified patent and that said Letters Patent are hereby corrected as shown below:

In Column 15, line 8, "illustrated" should be illustrative--.

In Column 17, line 32, after the phrase "(a)" insert --water--.

Signed and Sealed this

Eighth Day of May 1979

[SEAL]

Attest:

RUTH C. MASON
Attesting Officer

DONALD W. BANNER
Commissioner of Patents and Trademarks